N. W. YORK.
CANDY BATCH ROLLER.
APPLICATION FILED NOV. 7, 1910.
987,785.
Patented Mar. 28, 1911.
2 SHEETS—SHEET 1.
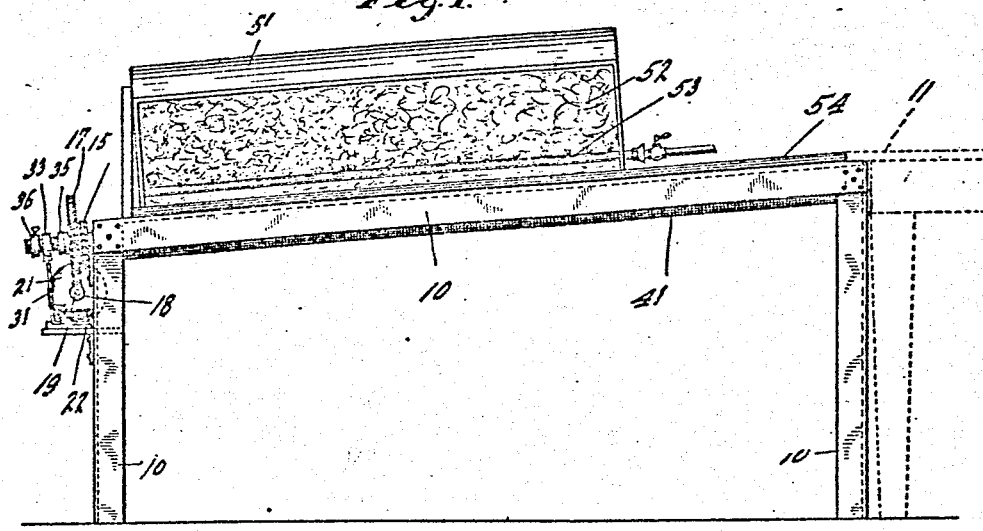
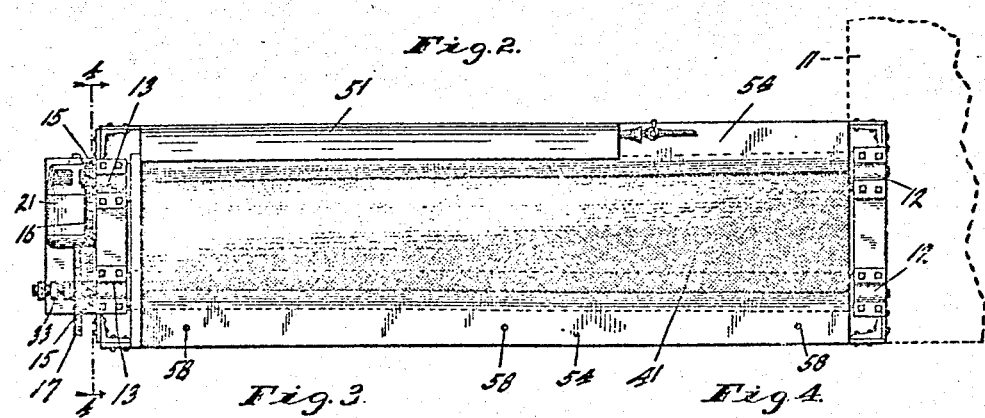
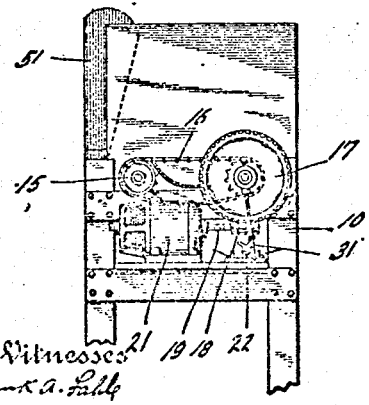
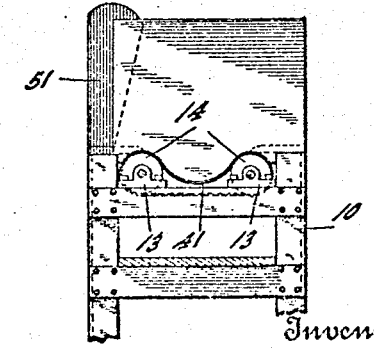
Witnesses
Frank A. Little
Thomas H. McMeans
Inventor
Nathaniel W. York,
By Bradford Hood
Attorneys N. W. YORK.
CANDY BATCH ROLLER.
APPLICATION FILED NOV. 7, 1910.
987,785.
Patented Mar. 28, 1911.
2 SHEETS—SHEET 2.
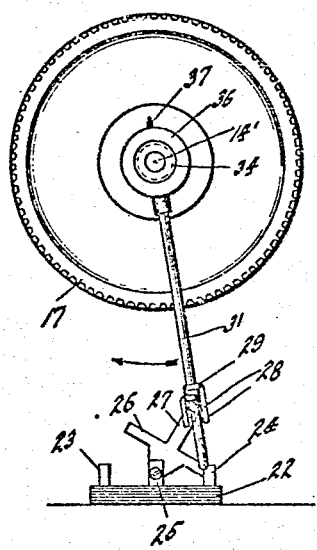
Fig. 5.
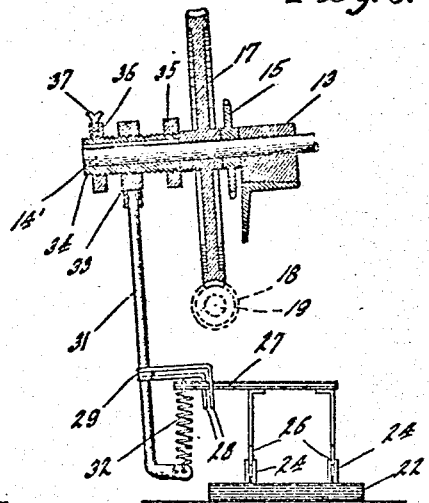
Fig. 6.
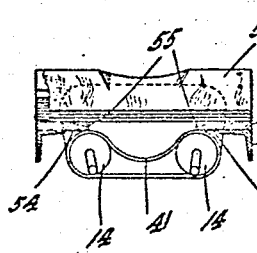
Fig. 9.
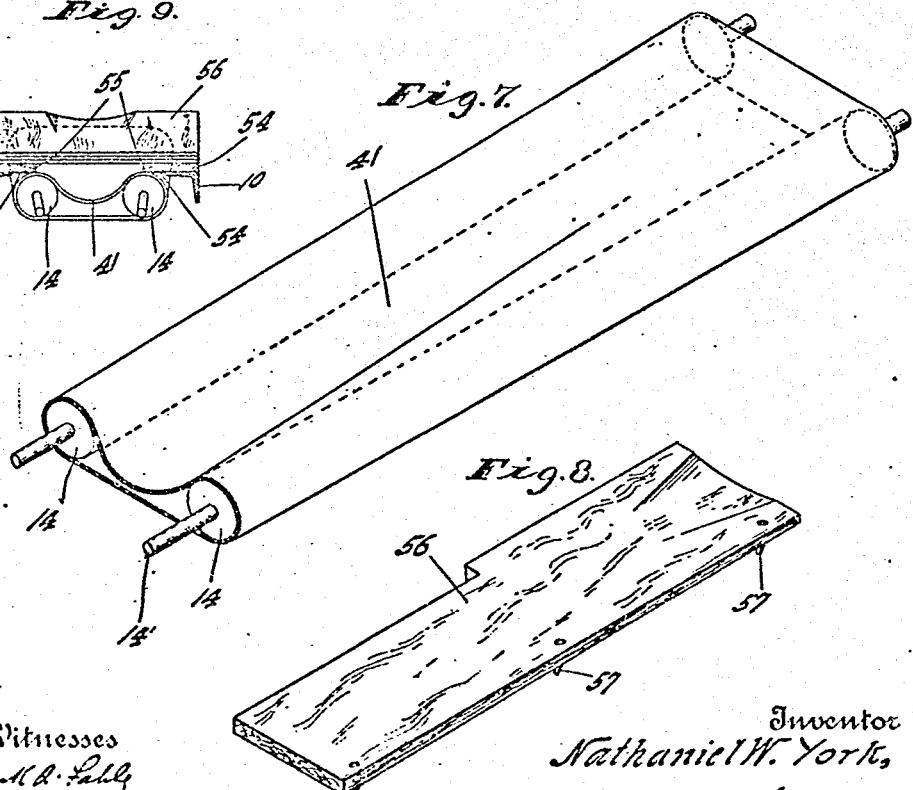
Fig. 7.
Fig. 8.
Witnesses
Frank A. Fahy
Thomas H. McMeans
Inventor
Nathaniel W. York,
By Bradford Hood
Attorneys.

UNITED STATES PATENT OFFICE.

NATHANIEL W. YORK, OF INDIANAPOLIS, INDIANA.

CANDY-BATCH ROLLER.

987,785.  Specification of Letters Patent.  Patented Mar. 28, 1911.

Application filed November 7, 1910. Serial No. 591,131.

*To all whom it may concern:*

Be it known that I, NATHANIEL W. YORK, a citizen of the United States, residing at Indianapolis, in the county of Marion and State of Indiana, have invented a new and useful Candy-Batch Roller, of which the following is a specification.

In the manufacture of hard candies of that type which is pulled into sticks, the candy after proper cooling is pulled to a suitable consistency and the mass, generally forty or fifty pounds, is then striped, if striped goods are to be produced, and molded into a general conical form and the small end pulled out into a long stick about ten feet long and during such manipulation it is necessary to keep the general mass in proper shape and, in order to prevent too rapid cooling, the general mass is laid upon a table in front of a low fire, the operator from time to time turning the mass so as to keep it from becoming flattened and so as to keep it uniformly heated. A very considerable amount of skill is required in handling the general mass before the fire in such way as to keep it in proper shape to facilitate the ready production of the proper size stick; to keep the stripes straight; to keep the general mass from becoming too hot in spots, etc., and rapid production of the sticks can only be accomplished after a very considerable amount of experience.

The object of my invention is to produce an apparatus by means of which a general mass will be automatically formed and maintained in the desired general conical condition and be continually turned before the fire in such way, however, as not to produce a permanent twist or distortion of the stripes on the general mass.

The accompanying drawings illustrate my invention.

Figure 1 is a front elevation; Fig. 2 a plan; Fig. 3 an end elevation; Fig. 4 a section on line 4—4 of Fig. 2; Fig. 5 an enlarged detail elevation of the reversing switch mechanism; Fig. 6 an axial section of the parts shown in Fig. 5; Fig. 7 a perspective detail showing the arrangement of the rolls and supporting belt; Fig. 8 a perspective detail of a cover board intended to be used as a cover for the belt so as to thus form an ordinary flat cover board, and Fig. 9 a sectional detail showing the cover in place.

In the drawings, 10 indicates a suitable supporting frame designed to be moved up against the end of an ordinary rolling table 11. The frame 10 is provided at opposite ends with shaft bearings 12, 12 and 13, 13, the bearings 13, 13 being a little nearer together than the bearings 12, 12. Journaled in each pair of bearings 12 and 13 is a cylindrical roller 14. The two rollers are preferably arranged with their outer ends lower than their delivery ends, as is clearly shown in Fig. 1 and, because of the spacing of the bearings 13, the said rollers are closer together at their lower ends than they are at their upper delivery ends. Each of the rollers is provided at one end with a sprocket wheel 15, and the two sprocket wheels are connected by a suitable chain 16. Carried by the shaft 14' of one of the rollers is a worm wheel 17 which meshes with a worm 18 carried by the shaft 19 of a small electric motor 21. The motor is in circuit with a suitable reversing switch 22 of ordinary type having reversing terminals 23 and 24 and center terminal 25 as usual. Terminal 25 carries a swinging knife 26 having an operating arm 27 which is projected between the ends 28 of a spring 29 mounted about a rod 31. The end of rod 31 lies below arm 27 and is connected thereto by a tension spring 32. Arm 31 projects radially from a nut 33 which is threaded upon a sleeve 34 keyed to the end of shaft 14' to which the worm wheel 17 is keyed. Sleeve 34 is provided at one end with a collar 35 which may be fixed, and at the opposite end with an adjustable collar 36 threaded upon the sleeve and adapted to be held in any desired position of adjustment by means of a suitable set screw 37.

Sleeved over the two rollers 14, 14 is a flexible endless belt 41. The belt 41 is of the same dimension at one end as at the other and is of such length that, when sleeved upon the rollers, it will be drawn tightly between the rollers at their delivery end and will consequently sag between the rollers to a greater extent as the opposite end of the rollers is approached, as is clearly shown in Fig. 7. By this arrangement, I produce a flexible conical pocket into which the mass of candy may be deposited.

Erected at the back side of the structure above the belt is a heater 51 of ordinary type comprising a reflecting backing 52 and a burner 53.

Frame 10 is provided at opposite sides with boards 54, 54 which overlie the belt to about the middle of the rollers, the upper edges being tapered downwardly as indicated at 55 so as to somewhat conform to the general shape of the pocket formed by the belt 41.

At times it is desirable to have a flat heater board in front of the heaters 51 and I therefore provide a cover board 56 which may be readily placed upon the boards 54 so as to bridge the pocket formed by the belt 41, this cover being readily detachable by means of short dowel pins 57 formed to enter suitable holes 58 formed in the boards 54. It will of course be understood that any other suitable means for retaining the cover board 56 in place may be provided.

In operation, the mass of candy will be initially formed, and striped if desired, the mass being roughly shaped into a cone as usual. It will then be placed upon the belt 41 with the large end of the mass in the greatest sag of the belt. The motor 21 will then be started and the belt will be driven in one direction or the other. All portions of the belt will move at the same speed and consequently the small end of the cone of the mass of candy will be given a greater number of revolutions than the large end, thus tending to further conify the mass but this action also results in a twisting of the stripes of the mass. As the belt rotates, nut 33 will advance along the threads of sleeve 34 until it comes into contact with collar 35, whereupon its further longitudinal advance on the sleeve will be stopped and consequently the arm 31 will tend to swing with shaft 14′ as it is rotated in the direction indicated by the arrow in Fig. 5. This will bring one of the spring arms 28 into engagement with arm 27 of the knife switch 26 and swing said switch away from terminals 24 into engagement with terminals 23, the spring 32 serving to pull the switch down into place. As soon as this occurs, the current in the motor will be reversed, the motor will reverse in direction, the movement of shaft 14′ will be reversed, and nut 33 will travel longitudinally on the sleeve 34 in the opposite direction until it engages collar 35, when the operation will be repeated. As soon as the rolls are reversed in direction the mass of candy will be rolled in the opposite direction first taking the twist out of the stripes and then twisting them in the opposite direction, this twist, however, not being more than about one complete turn beyond normal in either direction. By this arrangement the mass of candy is constantly conified and uniformly presented to the heater so that the operator has merely to pull out the tip of the mass on to the table 11.

I have found by actual practice that an operator of very little experience and ordinarily slow in the production of stick candy can, with my machine, considerably more than double his output and at the same time produce a more uniform grade of product. The belt 41 forms a perfectly smooth pocket for the mass of candy so that it is not marred in any way but instead, is continually kept in a smooth condition with no tendency to ride up upon the flanking boards 54.

I claim as my invention:

1. A candy handling machine comprising a flexible supporting belt arranged to form a conical pocket, and means by which said belt may be moved transversely of the axis of the cone to rotate the candy automatically first in one direction and then in the other.

2. A candy handling machine comprising a flexible supporting belt arranged to form a conical pocket, and means by which said belt may be moved transversely of the axis of the cone to rotate the candy.

3. A candy handling machine comprising a pair of cylindrical rollers having converging axes, a flexible belt sleeved over said rollers to form a conical pocket therebetween, and means by which said rollers may be rotated to move the belt transversely of the axis of the cone.

4. A candy handling machine comprising a pair of cylindrical rollers having converging axes, a flexible belt sleeved over said rollers to form a conical pocket therebetween, driving means connected with said rollers to move the belt transversely of the axis of the cone, and means for automatically reversing the action of the driving means on said rollers to automatically reverse the direction of movement of the belt.

5. A candy handling machine comprising a pair of rollers having converging axes, an endless belt sleeved over said rollers to form a conical pocket therebetween, an electric motor, a driving connection between said motor and said rollers, a reversing switch in the circuit of said motor, and means for automatically operating said switch to intermittently reverse the direction of movement of the belt.

6. A candy handling machine comprising a pair of rollers having converging axes, an endless belt sleeved over said rollers to form a conical pocket therebetween, an electric motor, a driving connection between said motor and said rollers, a reversing switch in the circuit of said motor, a threaded member rotated by the motor, a nut threaded on said threaded member, a pair of collars associated with said threaded member at opposite ends thereof to limit the longitudinal movement of the nut on said threaded member, a radially extending arm carried by said nut, and reciprocable reversing mechanism associated with said arm.

7. A candy handling machine comprising a pair of rollers having converging axes, an endless belt sleeved over said rollers to form a conical pocket therebetween, an electric motor, a driving connection between said motor and said rollers, a reversing switch in the circuit of said motor, a threaded member rotated by the motor, a nut threaded on said threaded member, a pair of collars associated with said threaded member at opposite ends thereof to limit the longitudinal movement of the nut on said threaded member, a radially extending arm carried by said nut, an electric motor geared to said rollers, a reversing switch in the circuit of said motor, and a connection between said arm and said reversing switch, said connection comprising spring fingers forming a lateral connection in opposite directions between said arm and switch, and also comprising a spring connection between said switch and arm tending to move the switch relative to the arm.

8. A candy handling machine comprising a pair of rollers having converging axes, an endless belt sleeved over said rollers to form a conical pocket therebetween, an electric motor, a driving connection between said motor and said rollers, a reversing switch in the circuit of said motor, a threaded member rotated by the motor, a nut threaded on said threaded member, a pair of collars associated with said threaded member at opposite ends thereof to limit the longitudinal movement of the nut on said threaded member, a radially extending arm carried by said nut, an electric motor geared to said rollers, a reversing switch in the circuit of said motor, and a connection between said arm and said reversing switch.

In witness whereof, I, have hereunto set my hand and seal at Indianapolis, Indiana, this second day of November, A. D. one thousand nine hundred and ten.

NATHANIEL W. YORK. [L. S.]

Witnesses:
ARTHUR M. HOOD,
THOMAS W. MCMEANS.

---

Copies of this patent may be obtained for five cents each, by addressing the "Commissioner of Patents, Washington, D. C."